(No Model.) 6 Sheets—Sheet 1.

E. P. & H. C. WALTER.
MACHINE FOR CUTTING SPIRAL PINIONS.

No. 412,215. Patented Oct. 1, 1889.

Witnesses:
S. Williamson
Philo H. Prindle

Inventors,
Edward P. Walter
Henry C. Walter
by F. W. Smith Jr.
their attorney

N. PETERS, Photo-Lithographer, Washington, D. C.

(No Model.) 6 Sheets—Sheet 2.

E. P. & H. C. WALTER.
MACHINE FOR CUTTING SPIRAL PINIONS.

No. 412,215. Patented Oct. 1, 1889.

Witnesses
J. Williamson
Philo H. Prindle

Inventors
Edward P. Walter
Henry C. Walter
by F. W. Smith Jr.
their attorney

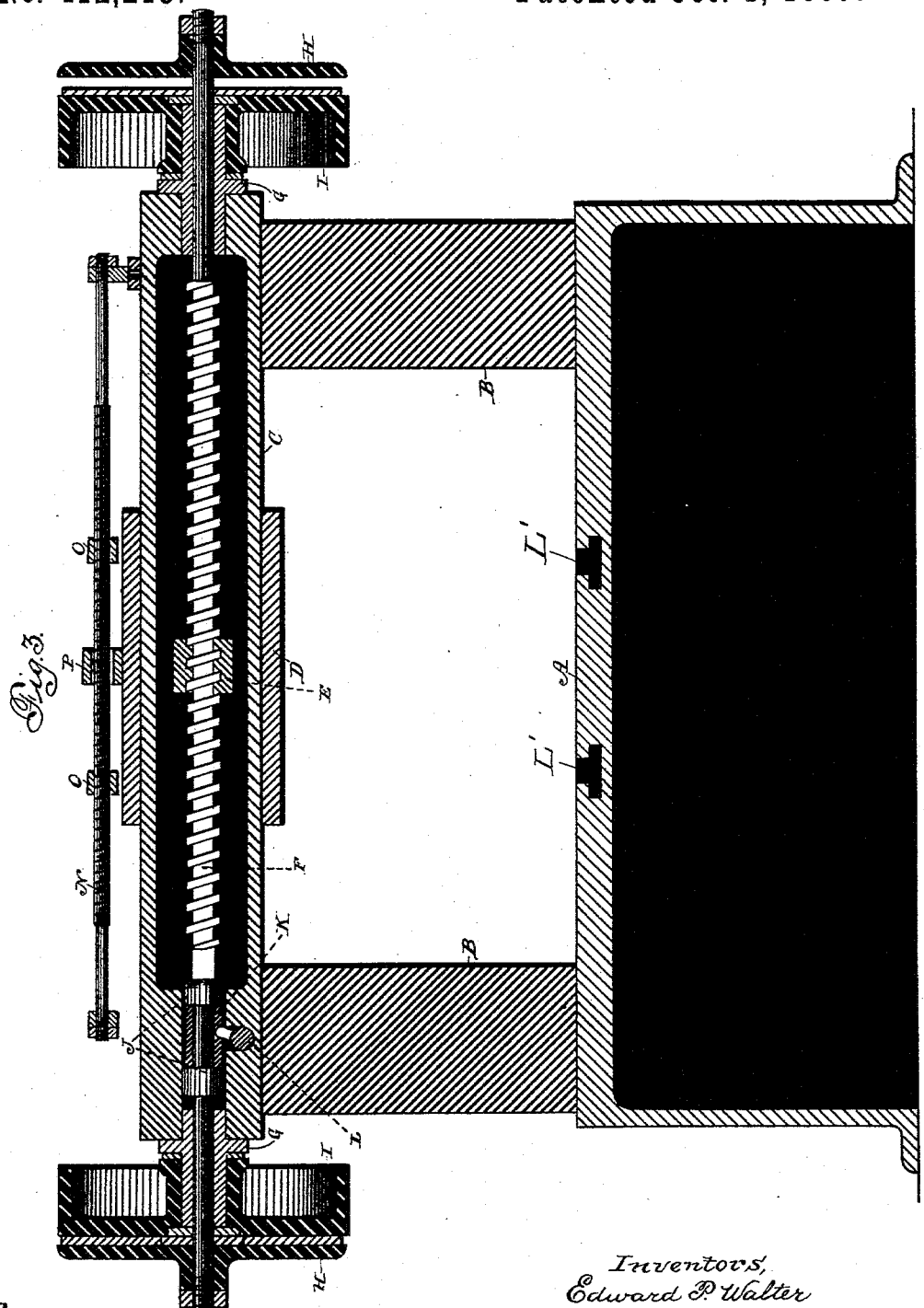

(No Model.) 6 Sheets—Sheet 4.
E. P. & H. C. WALTER.
MACHINE FOR CUTTING SPIRAL PINIONS.
No. 412,215. Patented Oct. 1, 1889.
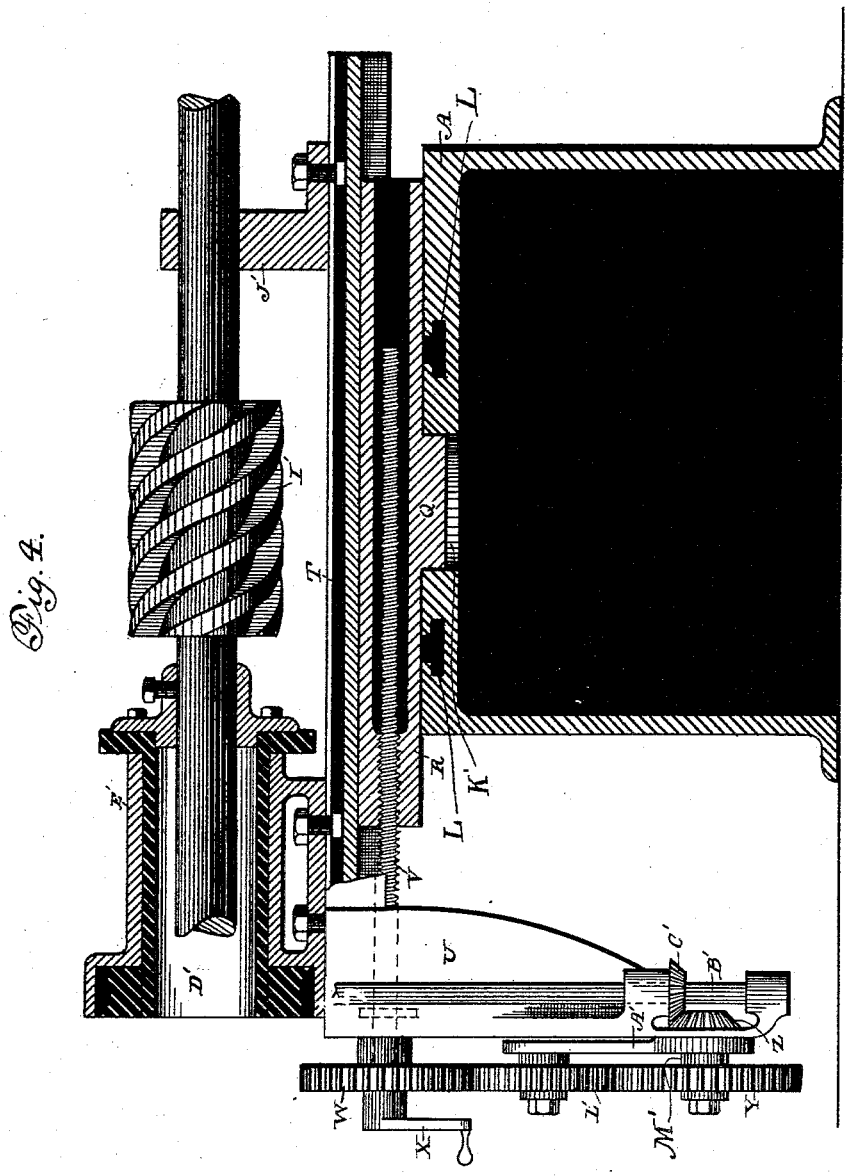
Witnesses,
J. S. Williamson
Philo H. Pindle
Inventors,
Edward P. Walter
Henry C. Walter
by F. W. Smith Jr.
their attorney

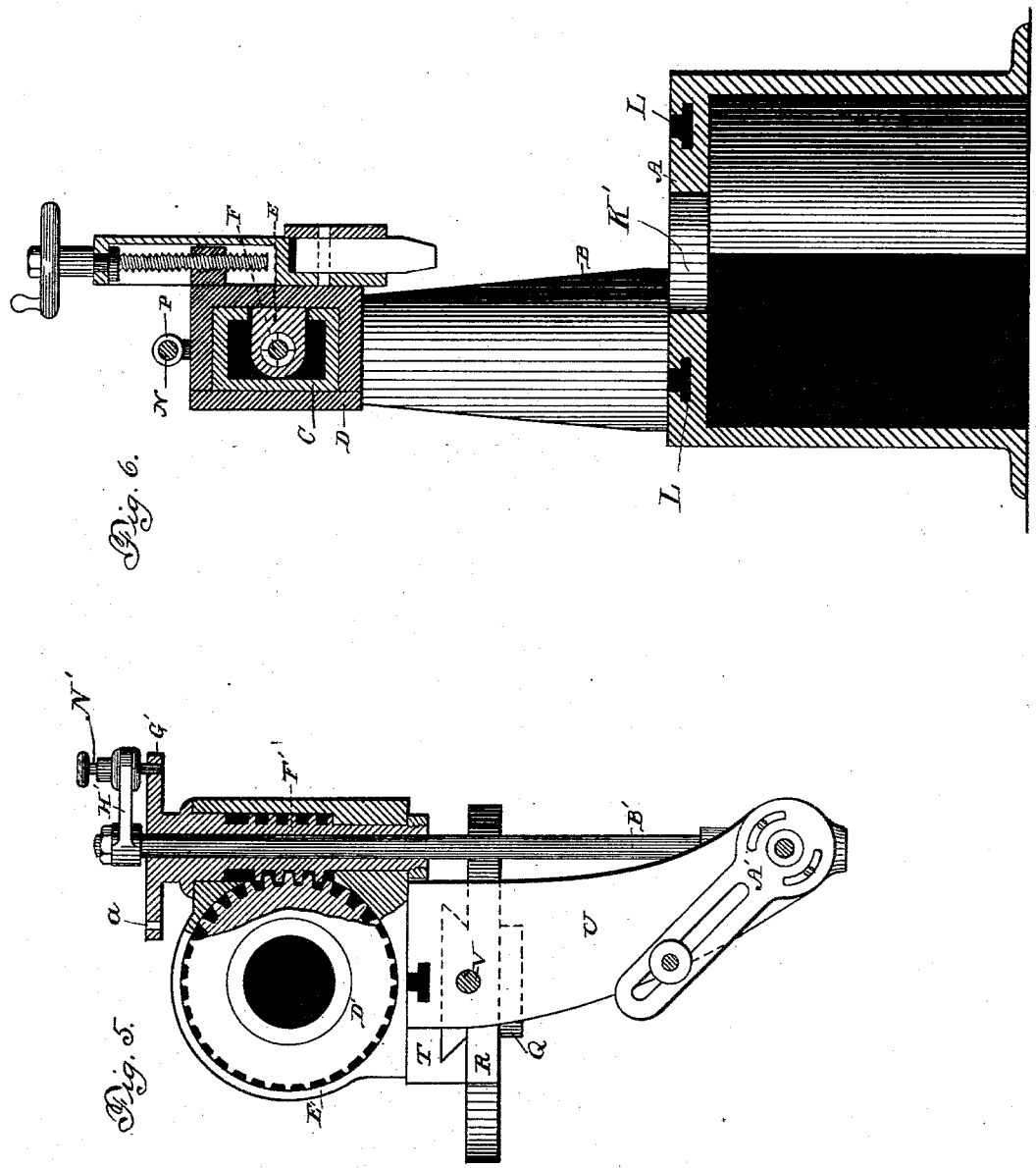

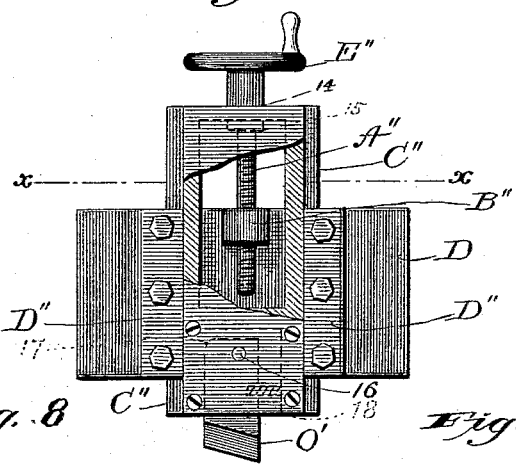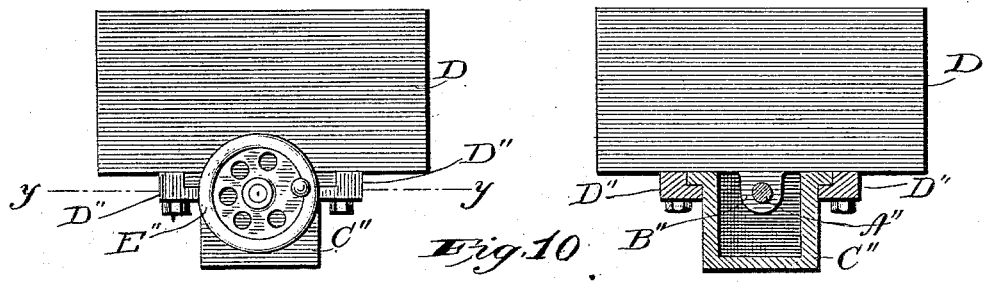

UNITED STATES PATENT OFFICE.

EDWARD P. WALTER AND HENRY C. WALTER, OF BRIDGEPORT, CONNECTICUT, ASSIGNORS TO MANNING, MAXWELL & MOORE, OF NEW YORK, N. Y.

MACHINE FOR CUTTING SPIRAL PINIONS.

SPECIFICATION forming part of Letters Patent No. 412,215, dated October 1, 1889.

Application filed June 15, 1889. Serial No. 314,363. (No model.)

*To all whom it may concern:*

Be it known that we, EDWARD P. WALTER and HENRY C. WALTER, citizens of the United States, residing at Bridgeport, in the county of Fairfield and State of Connecticut, have invented certain new and useful Improvements in Machines for Cutting Spiral Pinions; and we do hereby declare the following to be a full, clear, and exact description of the invention, such as will enable others skilled in the art to which it appertains to make and use the same.

Our invention relates to certain new and useful improvements in machines for cutting spiral pinions or for producing any description or pitch of thread upon shafts or other work of cylindric form, and has for its object to provide mechanism partly rotary and in part reciprocatory, whereby the cutting of said threads may be economically and rapidly accomplished; and with these ends in view our invention consists in the details of construction and combination of elements hereinafter fully and in detail explained, and then recited in the claims.

In order that those skilled in the art to which our invention appertains may more fully understand both how to make and use our improvement, we will describe the same in detail, referring by letter to the accompanying drawings, which form a part of this specification, and in which—

Figure 1:
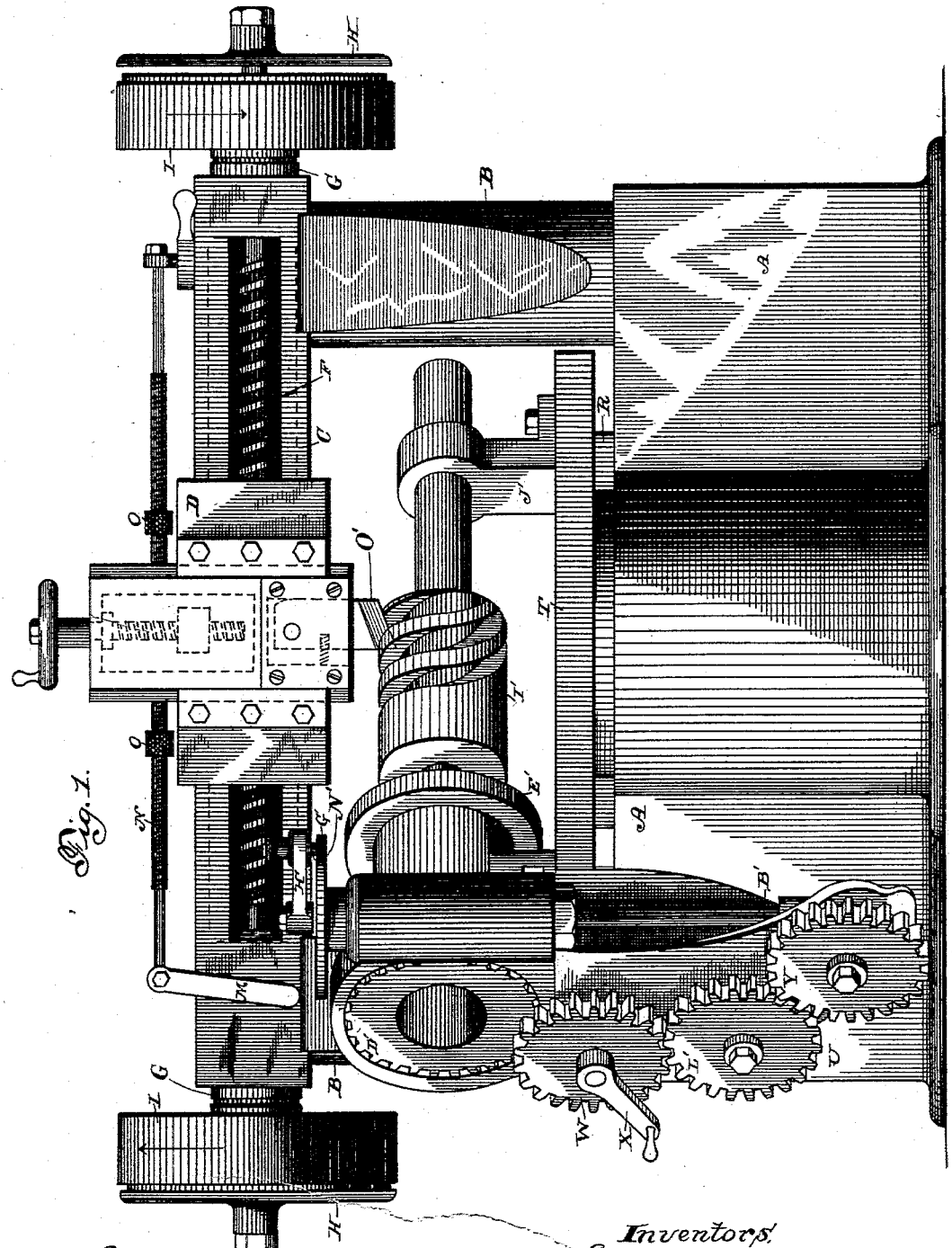
Figure 2:
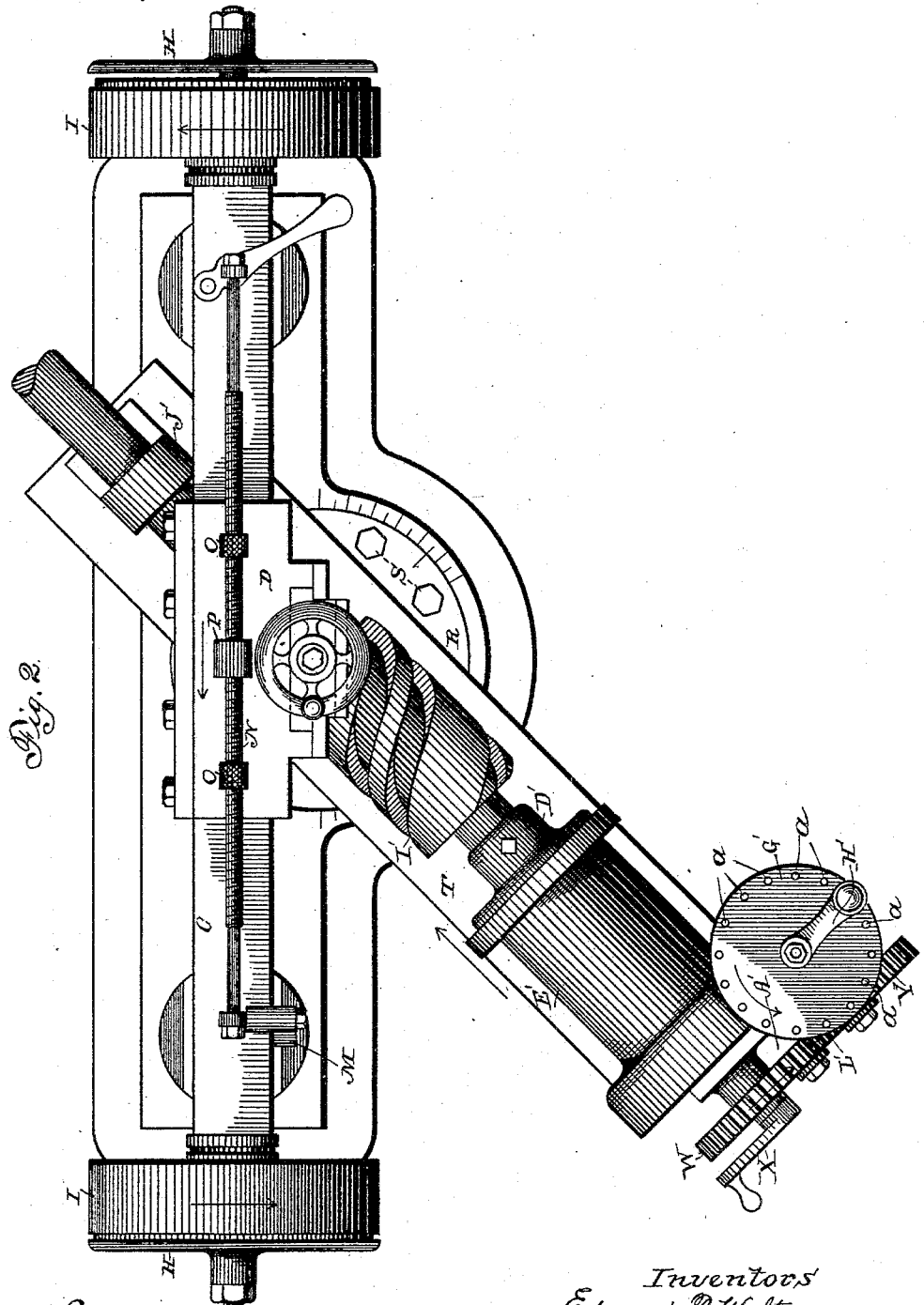

Figure 1 is a front elevation of our machine; Fig. 2, a plan view thereof; Fig. 3, a central longitudinal vertical section through the bed and tool-operating mechanism; Fig. 4, a sectional elevation of the work-operating mechanism; Fig. 5, an end view, partly in section, of the work-operating mechanism, the gears being removed; Fig. 6, a central vertical cross-section of the tool holding and operating device; Fig. 7, a detail sectional elevation of the tool-carriage and tool-manipulating means; Fig. 8, a plan of the same; Fig. 9, a section at line *x x* of Fig. 7, and Fig. 10 a central vertical longitudinal section of said carriage and tool-manipulating mechanism at the line *x x* of Fig. 8.

Similar letters denote like parts in all the figures of the drawings.

A is the bed, preferably a hollow casting, upon which the operative parts of our machine are supported, and which we prefer to construct with a bowed extension in front, the better to mount the work-carrying mechanism.

The moving parts of our machine may be said to be divided into and treated under two separate heads, viz: the tool-carrying mechanism, which has a reciprocating movement, and the work-holding mechanism, which has a reciprocatory, and in addition thereto and simultaneous therewith a rotary, movement.

The tool-holding mechanism consists of the columns B, upon whose tops is mounted the guideway C, upon which the tool-carriage D is arranged to travel. The guideway is hollow and the carriage surrounds it. A lug E projects from the said carriage into the interior of the guideway through the lengthwise opening, which clearly appears at Fig. 3.

F is a rod, which is screw-threaded, except as to its extremities, and which passes longitudinally through the guideway. It is adapted to turn in bearings formed in sleeves G at either end of the guideway. The screw-threaded portion of the rod passes through the lug E, which is suitably threaded, and thus the screw carries the tool-carriage upon the guideway, as will hereinafter more fully appear.

H are clutch-disks mounted rigidly on the ends of rod F, and I are pulleys journaled upon sleeves G, (see Fig. 3,) which pulleys, together with the disks, form the friction-clutch and driving devices for the screw F and the tool-carriage.

For a more particular description of the clutch above mentioned we would refer to Letters Patent No. 329,244, granted to us the 27th day of October, 1885.

Upon the rod F, near one end, are two fast collars J, between which is a loose sleeve K.

L is a one-toothed pinion which engages with the loose sleeve last referred to, and M is a lever connecting the pinion aforesaid with a screw-threaded shipping-rod N, which extends longitudinal of the guideway above the tool-carriage.

O are shipper-nuts, threaded and adapted to travel on the rod N, and P is an open shipper-block mounted upon the tool-carriage and loosely surrounding the rod N.

By the clutches, screw-rod, shipper-rod, block, and nuts the reversal of the machine is effected, as will hereinafter be explained somewhat more in detail.

The work-holding portion of our machine is as follows: A hole K in the center of the bed of the machine and midway between the columns is closely fitted by a downward extension Q from the turn-table R, (see Fig. 4,) and this extension forms a pivotal point about which said table may be swung. To secure the table at any angle relative to the travel of the tool-carriage, a circular inverted-T-shaped track L is formed in the bed around the hole last mentioned, (see Figs. 4 and 6,) and head-bolts S (see Fig. 2) on the table, extend downward and engage with the track.

T is the work-carriage mounted in ways upon the turn-table, and U is a bracket extending downwardly from the end of the work-carriage, as aforesaid.

V is the driving-screw, shouldered into the bracket U and threaded through the end of the turn-table. (See Fig. 4.) This screw V carries a gear W and a handle X, as seen at Fig. 4. By the screw and handle the carriage is moved upon the turn-table backward or forward.

Y is a gear mounted on a short shaft M, which is journaled in the lower extremity of the bracket U, and a beveled gear Z is secured upon the other end of the said short shaft.

A' is a swinging arm, upon which an idle-gear L', meshing with gears W and Y, is journaled.

B' is a vertical shaft arranged in journals formed on the bracket U, and C' is a beveled gear rigid on said shaft and meshing with and receiving motion from gear Z.

D' is a chuck mounted upon the carriage T in a bearing E', which permits revolution to the chuck therein. At its rear end the chuck is provided with gear-teeth, (see Fig. 5,) which mesh with a worm F' on the vertical shaft B. Secured upon the top of the worm is an index-plate G, provided with holes $a$ for various graduations of work, as is seen in ordinary indexing-machines.

Upon the top of the shaft B is rigidly mounted an arm H', having therein a pin N', to engage with the holes in the index-plate.

I represents a pinion properly held in the chuck and supported as to its outer end in a rest J, which is secured upon the top of the work-carriage.

The operation of our improvement is as follows: The pinion-blank is first placed in position, as seen at Fig. 1. The pitch is regulated by the speed of the gear Y, which controls the revolution of the gear D' and chuck E', and said speed is increased or decreased according as the diameter of the cog Y is greater or less than the diameter of the cog W. Thereby the rotary movement of the blank is made to bear the proper proportion to the forward motion of the carriage and work, which latter is effected by means of the screw V, so that the dual motion corresponds with the helix of the pinion to be cut. The reciprocations of the cutting-tool O and its carriage are rendered automatic by the shipper-rod and its nuts. As either of said nuts in the course of travel of the tool-carriage is engaged by the shipper-block, the rod is carried with the carriage for a sufficient distance, so that through the lever, one toothed pinion, and loose sleeve the disk then in engagement with the pulley is thrown out of said engagement and the other disk is moved into contact and engagement with its pulley. The pulleys are driven in opposite directions. Adjusting the shipper-nuts on the rod determines the stroke of the tool. The raising and lowering of the cutting-tool is accomplished by means of the threaded rod A'', which runs through a stationary nut B'', projecting from the carriage D, and is shouldered, as seen at 14 and 15, directly against the tool-head C'', which latter is gibbeted within ways B'', secured to the carriage. A hand-wheel E'' is secured to the top of said rod A'', and by manipulating said wheel the said rod is operated to cause the head C'' to slide in its bearings. The cutting-tool O' is eccentrically pivoted, as seen at 16, within the head C'', and rests in normal position firmly against the rear wall of said head, the rear upper corner of said tool being rounded, as seen at 17, to permit of the tripping of said tool on its backward movement along the work. A spring 18, bearing against the front edge of the tool and the front wall of the head, renders the tripping action resilient.

We do not deem it necessary to enter into further description of the operation of the tool and tool-head, since we lay no claim to them, and, moreover, they are precisely the same as is exemplified in the popular planing-machines now in use.

By the tool (reciprocating, as aforesaid, longitudinal of the machine) and the mechanism whereby the work is fed the spiral is cut in the blank as follows: The work-carriage is swung to the proper angle relative to the travel of the tool, which determines the pitch of the spiral, and is there secured. Then the tool is permitted to cut into the blank diagonally and tangentially thereto, taking out a small chip. Then at the backward movement of the tool through the handle, gears, &c., the blank is turned slightly to present fresh metal to the tool. Thus the groove is planed out little by little, the blank being moved forward and rotated at each backward stroke of the tool until the groove has been cut the whole length of the blank. The work-carrying mechanism is then rotated backward, when by the index-plate and handle the blank is properly turned for the cutting of the next groove, when the same process is repeated. The exact manner in which the involute groove is cut by the truncated-wedge-shaped tool is very difficult of explanation, and we are able only to say that it arises from the compound forward and rotary motion of the blank and the reciprocating movement of the tool whose travel is tangential to the cylinder. As the tool cuts, the first part of its stroke is devoted to finishing the walls of the groove left rough by a former cut, the middle of the stroke acts both upon the walls and plows out the bottom of the groove, and the latter part of the stroke roughs out metal preparatory to the next cut. The successive cuts form the beginning act upon the groove, which is finished as the successive portions of the latter, by the rotation of the blank, pass below the horizontal plane in which the tool travels.

Having thus described our invention, what we claim is—

1. The combination, with the bed, the turn-table, the carriage mounted thereon, the chuck arranged upon the carriage, and means, as described, whereby forward motion may be imparted to the carriage and both forward and rotary motion to the chuck, of the cutting-tool and carriage mounted above the work-carriage and adapted to be reciprocated, substantially as set forth.

2. The combination, with the tool-carriage and tool adapted to be reciprocated upon the guideway, of the work-carriage adapted to travel upon ways beneath the tool, the chuck mounted upon the carriage, and the gears and pinion whereby rotary motion is imparted to the chuck, substantially as described.

3. The combination, with the guideway supported upon columns from the bed, of the screw extended longitudinally through the guideway, the tool-carriage mounted upon the guideway and carried by the screw, and the pulleys and clutch-disks mounted at either end of the screw, substantially as and for the purpose set forth.

4. The combination, with the guideway, of the screw longitudinal thereof and the tool-carriage carried by said screw, the pulleys and clutch-disks, and the shipper-rod, its nuts, and connections whereby the engagement of the disks and the movement of the tool-carriage is reversed, substantially as specified.

5. The combination, with the bed of the machine, of the turn-table arranged thereon, the carriage mounted upon the turn-table and supporting the chuck, the driving-screw shouldered in the carriage and threaded in the turn-table, the gears and upright shaft, and the worm meshing with the gear on the chuck, all arranged as and for the purpose set forth.

6. The combination, in a machine of the character described, of the following mechanical element, to wit: the traveling tool-carriage and its tool, the longitudinally-moving work-carriage beneath the tool, the chuck mounted and adapted to rotate upon the work-carriage, and mechanism, as described, whereby the combined rotary and forward motions are imparted to the chuck, substantially as set forth.

7. The combination, with the bed, of the turn-table, the movable work-carriage and the chuck geared at its rear end, the gears and the carriage-driving screw, the vertical shaft, index-plate, and pin, and the worm meshing with the gear upon the chuck, substantially as described.

In testimony whereof we affix our signatures in presence of two witnesses.

EDWARD P. WALTER.
HENRY C. WALTER.

Witnesses:
S. H. HUBBARD,
S. S. WILLIAMSON.